(12) United States Patent
Zhao et al.

(10) Patent No.: US 7,713,656 B2
(45) Date of Patent: May 11, 2010

(54) TERMINAL PLATFORMS FOR BATTERIES IN IMPLANTABLE MEDICAL DEVICES

(75) Inventors: Jennifer J. Zhao, Plymouth, MN (US); Thomas Ceballos, Spring Lake Park, MN (US); James Strom, Arden Hills, MN (US); Richard A. Bruchmann, Andover, MN (US); John E. Nicholson, Blaine, MN (US); Scott J. Robinson, Forest Lake, MN (US); Bernard F. Heller, Jr., Fridley, MN (US)

(73) Assignee: Medtronic, Inc., Minneapolis, MN (US)

( * ) Notice: Subject to any disclaimer, the term of this patent is extended or adjusted under 35 U.S.C. 154(b) by 172 days.

(21) Appl. No.: 11/343,350

(22) Filed: Jan. 31, 2006

(65) Prior Publication Data

US 2007/0182364 A1 Aug. 9, 2007

(51) Int. Cl.
*H01M 2/26* (2006.01)
*H01M 2/02* (2006.01)
*H02J 7/00* (2006.01)

(52) U.S. Cl. .................. 429/161; 429/178; 429/179; 320/107

(58) Field of Classification Search ......... 429/178–179, 429/180, 182, 211, 161; 439/55–85, 329, 439/493, 541.5, 709, 884–889; 320/107; 607/2, 4, 5, 9; 29/832; 361/669, 823
See application file for complete search history.

(56) References Cited

U.S. PATENT DOCUMENTS

| 5,235,742 | A | 8/1993 | Szyszkowski |
| 5,877,472 | A | 3/1999 | Campbell et al. |
| 6,721,602 | B2 | 4/2004 | Engmark et al. |
| 6,881,516 | B2 | 4/2005 | Aamodt et al. |
| 2003/0040779 | A1* | 2/2003 | Engmark et al. ............. 607/36 |
| 2004/0062986 | A1* | 4/2004 | Aamodt et al. ............. 429/181 |
| 2004/0091770 | A1* | 5/2004 | kim ........................... 429/180 |
| 2004/0224213 | A1* | 11/2004 | Dristy ......................... 429/37 |
| 2005/0162810 | A1 | 7/2005 | Seitz et al. |

* cited by examiner

*Primary Examiner*—Patrick Ryan
*Assistant Examiner*—Karie O'Neill Apicella

(57) ABSTRACT

A terminal platform comprising a first terminal block securable to a housing of the battery, a second terminal block configured to electrically connect to a terminal wire of the battery, and an insulating support electrically isolating the second terminal block from the first terminal block.

14 Claims, 13 Drawing Sheets

TERMINAL PLATFORMS FOR BATTERIES IN IMPLANTABLE MEDICAL DEVICES

BACKGROUND OF THE INVENTION

The present invention relates to implantable medical devices. More particularly, the present invention relates to feedthrough assemblies having filtering capabilities.

The present invention relates to terminal platforms for electrically connecting batteries to electronic components of implantable medical devices (IMDs).

Implantable pulse generators (IPG) and implantable cardioverter-defibrillators (ICDs) are electronic medical devices that monitor the electrical activity of the heart and provide therapy in the form of electrical stimulation to one or more of the heart chambers. These IMDs require batteries that are electrically connected to the electronic components that perform the pacing and cardioversion-defibrillation functions.

A standard technique for electrically connecting a battery to the electronic components of an IMD involves resistance spot welding hardwires between the battery and a hybrid containing the electronic components. However, the hardwires create rigid electrical connections that may break under applied stresses during manufacturing and use.

A more recent manufacturing trend involves automated laser ribbon bonding the terminals, in which wire ribbons are used to conduct electricity while simultaneously providing strain relief to tolerate the device level loading. There is an ongoing need for electrical connections between batteries and hybrids that are robust and efficient for manufacturing and use.

BRIEF SUMMARY OF THE INVENTION

The present invention relates to a terminal platform for use with a battery of an IMD electronic assembly, and a method of manufacturing the electronic assembly. The terminal platform includes a first terminal block (e.g., a positive block) securable to a housing of the battery, a second terminal block (e.g., a negative block), and an insulating support that electrically isolates the second terminal block from the first terminal block. The terminal platform allows the second terminal block to be disposed adjacent the battery without compromising the electrical isolation of the second terminal block relative to the battery housing.

DETAILED DESCRIPTION

Figure 1A:
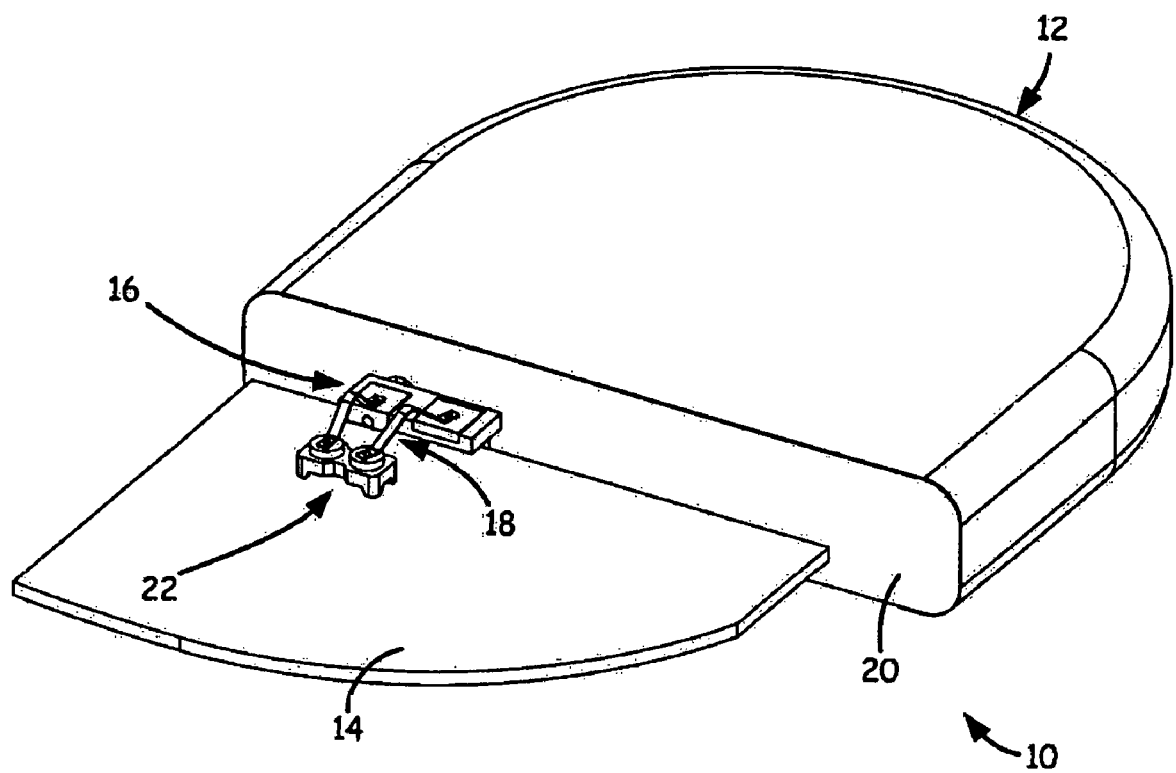
FIG. 1A is a top perspective view of an electronic assembly of an IMD.

FIG. 1A is a top perspective view of electronic assembly 10, which is an internal electronic assembly of an IMD. Electronic assembly 10 includes battery 12, hybrid 14, terminal platform 16, and ribbons 18. Battery 12 includes battery housing 20, which is formed from a conductive material. Hybrid 14 is a circuit board disposed adjacent battery 12, which connects to the electronic components of the IMD. Hybrid 14 includes contact pads 22, which are conductive sites for securing ribbons 18 to hybrid 14. The remaining circuitry of hybrid 14 is omitted for ease of discussion.

Terminal platform 16 is a battery terminal-connecting component secured to battery 12 adjacent hybrid 14. Terminal platform 16 provides a convenient location for connecting ribbons 18 to battery 12. As discussed below, terminal platform 16 is secured to battery housing 20 to protect fragile terminals of battery 12 during manufacturing and use. As a result, electronic assembly 10 may be manufactured in an automated manner with a reduced risk of damaging battery 12.

Ribbons 18 are connected to hybrid 14 and terminal platform 16 with a standard welding process, such as laser ribbon bonding, resistance spot welding, and parallel gap welding. Ribbons 18 reduce the rigidity of the electrical connections between battery 12 and hybrid 14, which accordingly reduces the risk of accidentally severing the electrical connections during use. When operated, battery 12 supplies electrical power, through terminal platform 16 and ribbons 18, to contact pads 22 of hybrid 14, where the electrical power is then routed to the electronic components of the IMD.

Figure 1B:
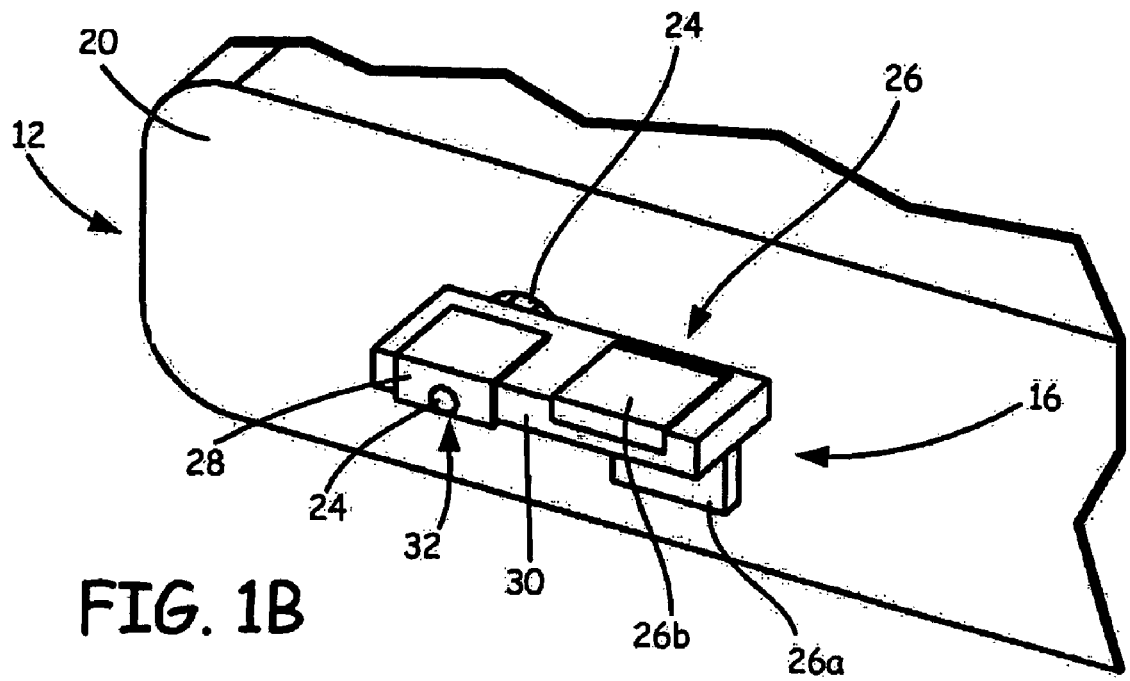
FIG. 1B is an expanded perspective view of a terminal platform secured to a battery of the electronic assembly.

FIG. 1B is an expanded perspective view of terminal platform 16 secured to battery housing 20. As shown, battery 12 further includes wire 24, which is a negative terminal of battery 12 and is electrically isolated from battery housing 20. Battery housing 20 accordingly is the positive terminal of battery 12. In an alternative embodiment, the polarities of battery housing 20 and wire 24 may be reversed such that wire 24 is the positive terminal of battery 12 and battery housing 20 is the negative terminal.

Terminal platform 16 includes positive block 26, negative block 28, and insulating support 30. Positive block 26 is an L-shaped, conductive terminal block that includes base portion 26a and contact portion 26b extending perpendicular to each other. Suitable conductive materials for positive block 26 include titanium, niobium, nickel, palladium, platinum, and alloys thereof. The suitable conductive materials may also be plated (e.g., gold plated). Base portion 26a is welded to battery housing 20, which provides an electrical connection between battery housing 20 and positive block 26.

Negative block 28 is a second conductive terminal block that includes channel 32. Suitable conductive materials for negative block 26 include the same materials as discussed above for positive block 26. Channel 32 extends through negative block 28 and provides an accessible location for receiving and retaining wire 24. When terminal platform 16 is secured to battery housing 20, wire 24 extends through channel 32 and is welded to negative block 28 at the exposed opening of channel 32. This provides an electrical connection between negative block 28 and wire 24. In an alternative arrangement, wire 24 may extend through the exposed opening of channel 32 in a bent-tip arrangement, in which case the tip of wire 24 is bent to mechanically lock wire 24 to negative block 28. The bent tip is then welded to negative block 28 further secure wire 24 to negative block 28.

Insulating support 30 is a rigid polymeric member that securely retains positive block 26 and negative terminal block 28, but is not directly connected to battery housing 20. As a result, positive block 26 functions as a cantilevered anchor that secures negative block 28 and insulating support 30 to battery housing 20. Insulating support 30 is derived from one or more dielectric materials that electrically isolate negative block 28 from battery housing 20 and positive block 26. This allows negative block 28 to be secured to battery housing 20 without the risk of electrically shorting battery 12. Suitable dielectric materials for insulating support 30 include electrically-insulating polymers, such as fluoropolymers, epoxy-functional compounds, polyetherimides, liquid crystal polymers, and combinations thereof. The electrically-insulating polymers may also be filled with strength enhancing particles (e.g., glass fibers).

Terminal platform 16 is formed by overmolding insulating support 30 onto positive block 26 and negative block 28, or by other similar molding processes (e.g., insert molding). Terminal platform 16 is then secured to battery housing 20 by inserting wire 24 through negative block 28, and welding base portion 26a to battery housing 20. Wire 24 is also welded to negative block 28. Once secured to battery housing 20, terminal platform 16 protects wire 24 during subsequent manufacturing processes (e.g., laser ribbon bonding), which reduces the risk of bending or breaking wire 24.

Figure 1C:
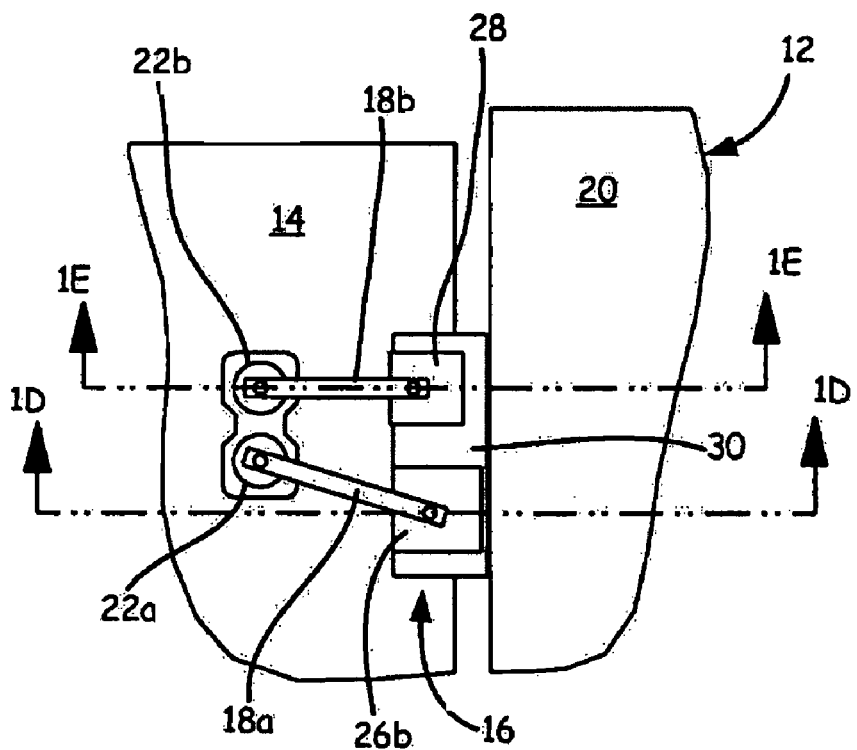
FIG. 1C is an expanded top view of the connection between the battery, the terminal platform, and a hybrid.

FIG. 1C is an expanded top view of the connection between hybrid 14, terminal platform 16, and battery housing 20. As shown, ribbons 18 (referred to herein as ribbons 18a and 18b) are secured to terminal platform 16 and contact pads 22 (referred to herein as contact pads 22a and 22b). In particular, flexible circuit 18a electrically connects contact pad 22a and positive block 26, and flexible circuit 18b electrically connects contact pad 22b and negative block 28. These connections allow electrical power to be delivered from battery 12 to hybrid 14.

As discussed above, terminal block 16 allows electronic assembly 10 to be manufactured in an automated manner. During the manufacture of electronic assembly 10, the combined battery 12/terminal platform 16 is positioned in an IMD casing independently of hybrid 14. The use of terminal platform 16 precludes the need to directly connect wire 24 of battery 12 to a terminal block on hybrid 14, which otherwise typically involves manual work that increases time and effort, and has the risk of bending or breaking wire 24. Instead, terminal platform 16 protects wire 24 during manufacturing, which allows the combined battery 12/terminal platform 16 and hybrid 14 to be positioned in the IMD casing with an automated process. Ribbons 18 are then bonded to hybrid 14 and terminal platform 16 to electrically connect hybrid 14 to battery 12.

During a laser ribbon bonding process, top-down compressive forces are applied to positive block 26 and negative block 28. Positive block 26 is directly welded to battery housing 20, and therefore, is capable of withstanding the compressive forces. Additionally, insulating support 30 mechanically reinforces negative block 28, which transfers the compressive forces applied to negative block 28 to insulating support 30 and the welded bond between positive block 26 and battery housing 20. This allows negative block 28 to also withstand the compressive forces, which correspondingly reduces the risk of bending or breaking wire 24 during the laser ribbon bonding process.

Another benefit of the arrangement of terminal platform 16 is that contact portion 26a of positive block 26 and negative block 28 have top flat surfaces that are substantially parallel. This allows the laser ribbon bonding processes to be performed at the same height, which also increases manufacturing efficiency.

Figure 1D:
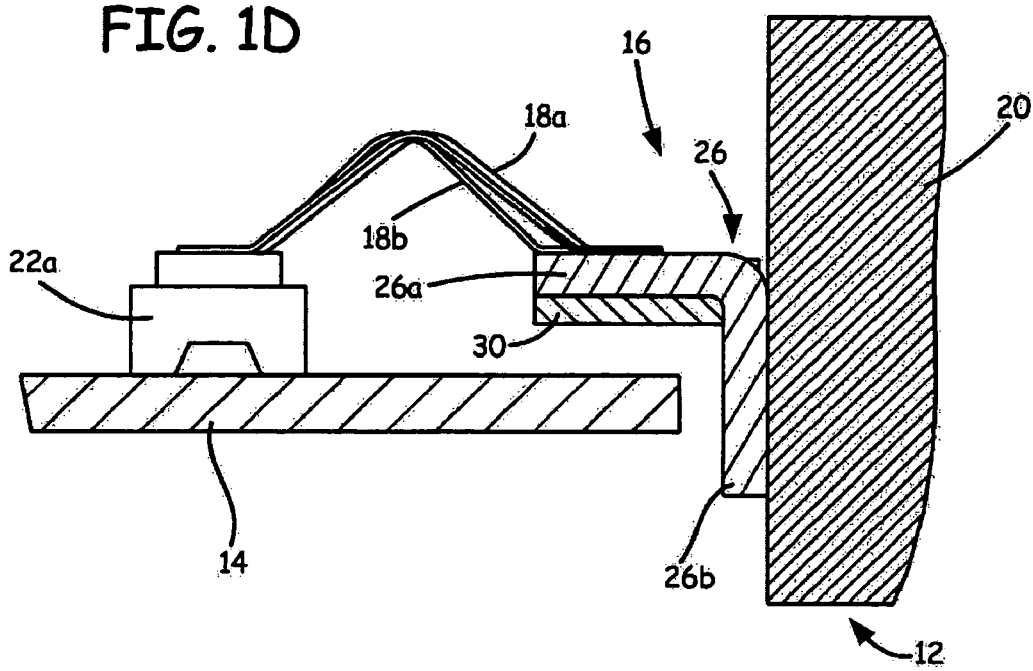
FIG. 1D is a sectional view of section 1D-1D taken in FIG. 1C, showing a positive terminal connection.

FIG. 1D is a sectional view of section 1D-1D taken in FIG. 1C, which focuses on the connections of positive block 26. As shown, base portion 26a of positive block 26 is welded to battery housing 20 to provide an electrical connection between positive block 26 and battery housing 20 (i.e., the positive terminal of battery 12). The electrical connection is correspondingly extended to contact pad 22a, which is connected to contact portion 26b of positive block 26 via flexible circuit 18a.

The entire footprint area of base portion 26a is desirably welded to battery housing 20 to increase the bond strength between terminal platform 16 and battery housing 20. The increased bond strength accordingly increases the supportive strength of terminal platform 16, and reduces the risk of negative block 28 moving relative to battery housing 20.

Figure 1E:
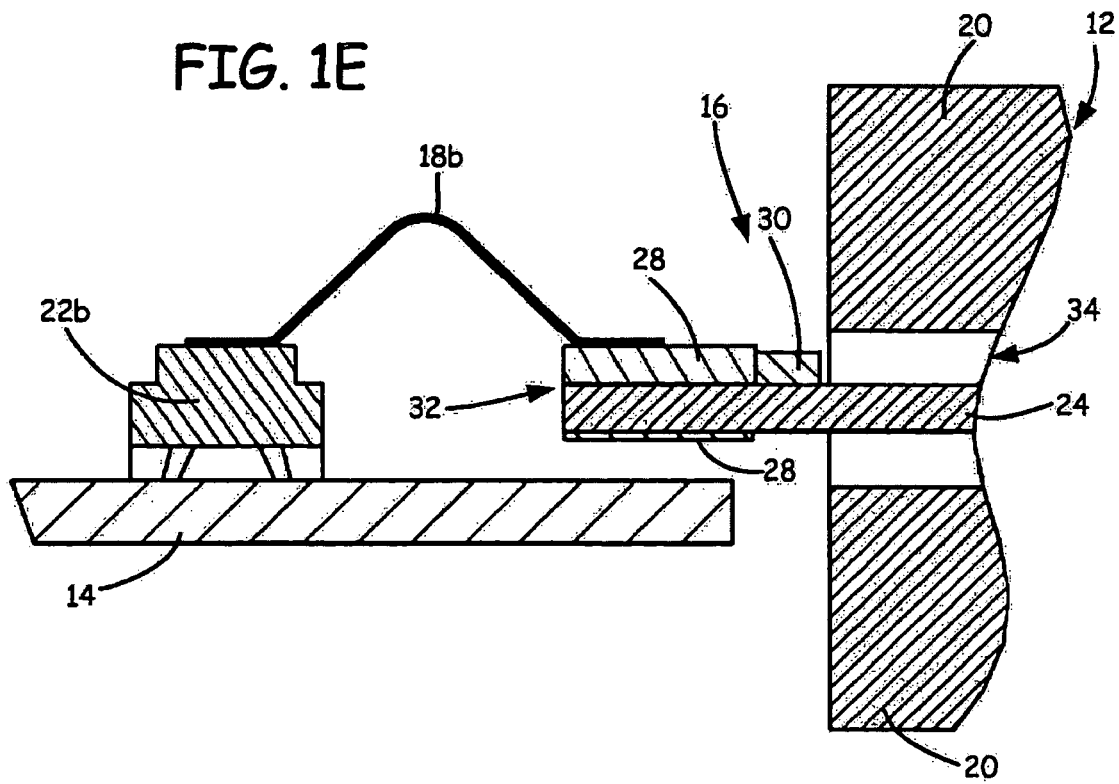
FIG. 1E is a sectional view of section 1E-1E taken in FIG. 1C, showing a negative terminal connection.

FIG. 1E is a sectional view of section 1E-1E taken in FIG. 1C, which focuses on the connections of negative block 28. As shown, battery housing 20 also includes opening 34 through which wire 24 extends to remain electrically isolated from battery housing 20. In alternative embodiments, channel 32 may be filled with a dielectric material to support wire 24 within channel 32. An example of a suitable dielectric material includes CABAL-12 (calcium-boro-aluminate) glass. Wire 24 is secured to negative block 28 within channel 32 to provide an electrical connection.

As further shown in FIG. 1E, the portion of terminal platform 16 adjacent negative block 28 is not directly connected to battery housing 20. Negative block 28 is only connected to wire 24, and remains electrically isolated from battery housing 20. In an alternative embodiment, however, insulating support 30 may be adhered to battery housing 20. The adhesion is in addition to the welding between battery housing 20 and positive block 26, and increases the mechanical reinforcement to negative block 28. In this alternative embodiment, negative block 28 remains electrically isolated from battery housing 20 by insulating support 30, which is disposed between battery housing 20 and negative block 28.

Figure 2A:
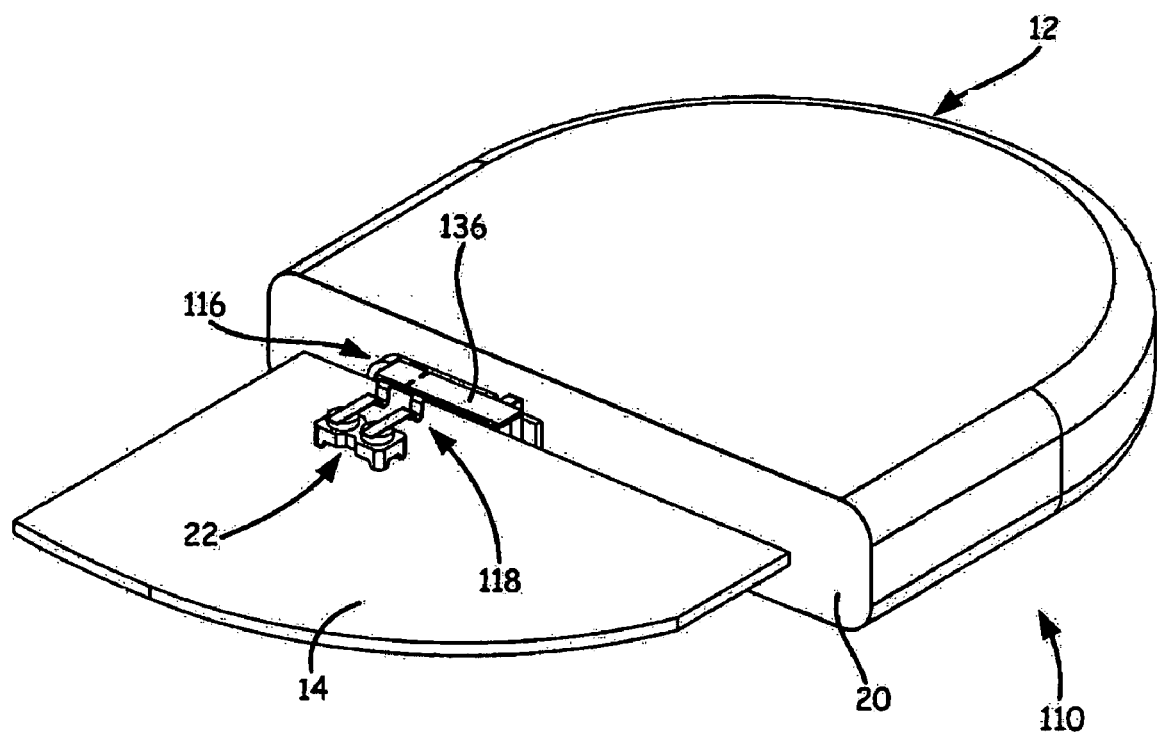
FIG. 2A is a top perspective view of a first alternative electronic assembly of an IMD.

FIG. 2A is a top perspective view of electronic assembly 110, which is an alternative to electronic assembly 10 shown in FIGS. 1A-1E. Electronic assembly 110 includes battery 12, hybrid 14, terminal platform 116, ribbons 118, and film 136, where battery 12 and hybrid 14 are the same as discussed above. Terminal platform 116 is a battery terminal-connecting component secured to battery 12 adjacent hybrid 14, and functions in a similar manner to terminal platform 16 of electronic assembly 10. Ribbons 118 are also similar to flexible circuits 18 of electronic assembly 10, and electrically connect hybrid 14 and terminal platform 116. Ribbons 118 are supported by film 136, which is a dielectric film secured to ribbons 118 to prevent electrical shorts. Film 136 also provides a convenient means for holding ribbons 118a and 118b during the weld attachment process.

Figure 2B:
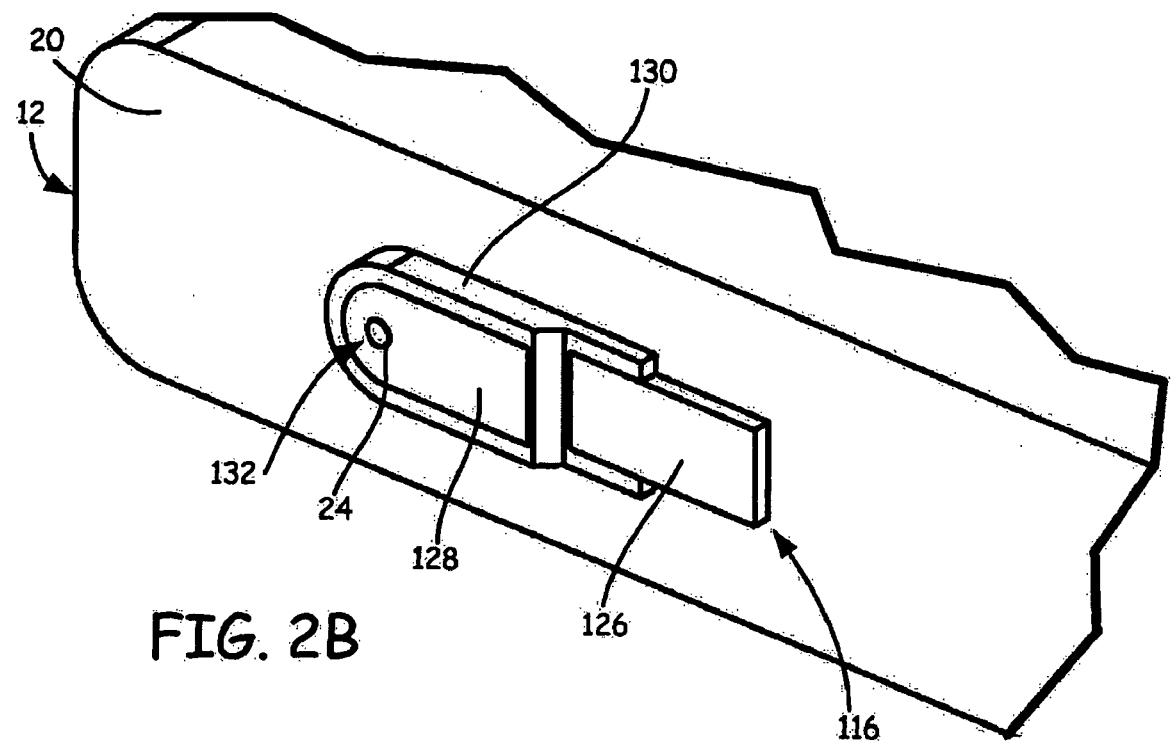
FIG. 2B is an expanded perspective view of a terminal platform secured to a battery of the first alternative electronic assembly.

FIG. 2B is an expanded perspective view of terminal platform 116 secured to battery housing 20. Hybrid 14 and ribbons 118 are omitted for ease of discussion. Terminal platform 116 includes positive block 126, negative block 128, and insulating support 130. In this embodiment, positive block 126 is a planar conductive terminal block that is welded to battery housing 20 to electrically connect battery housing 20 and positive block 126.

Negative block 128 is a second conductive terminal block that includes channel 132. Channel 132 extends through negative block 128 and provides an accessible location for receiving and retaining wire 24. When terminal platform 116 is secured to battery housing 20, wire 24 extends through channel 132 and is welded to negative block 128 at the exposed opening of channel 132. This provides an electrical connection between negative block 128 and wire 24. In an alternative arrangement, wire 24 may include a bent-tip arrangement, as shown in FIG. 1B.

Insulating support 130 is a rigid polymeric member similar to insulating support 30, and securely retains positive block 126 and negative terminal block 128. As a result, positive block 126 also functions as a cantilevered anchor that secures negative block 128 and insulating support 130 to battery housing 20. Insulating support 130 also electrically isolates negative block 128 from battery housing 20 and positive block 126 in the same manner as insulating support 30.

Terminal platform 116 may be formed and secured to battery housing 20 in the same manner as discussed above for terminal platform 16. As such, once secured to battery housing 20, terminal platform 116 protects wire 24 during subsequent manufacturing processes, which reduces the risk of bending or breaking wire 24. A notable difference between terminal platforms 16 and 116 is that terminal platform 116 provides vertical bonding surfaces for welding ribbons 118, while terminal platform 16 provides horizontal surfaces. As such, terminal platform 116 does not overlap hybrid 14, allowing hybrid 14 to be positioned at a variety of vertical locations relative to terminal platform 116.

Figure 2C:
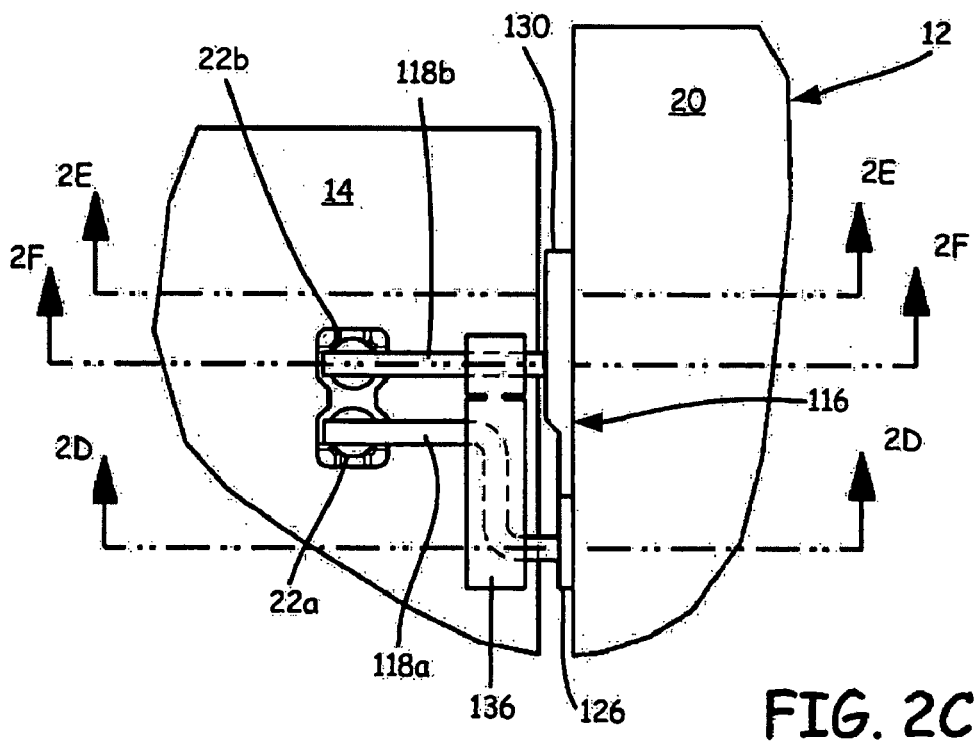
FIG. 2C is an expanded top view of the connection between the battery, the terminal platform, and a hybrid of the first alternative electronic assembly.

FIG. 2C is an expanded top view of the connection between hybrid 14, battery housing 20, and terminal platform 116. As shown, ribbons 118 (referred to herein as ribbons 118a and 118b) are secured to terminal platform 116 and contact pads 22a and 22b in a similar manner as shown in FIG. 1C. Ribbon 118a has a first end connected to positive block 126 and a second end that bends to align with contact pad 22a. Ribbon 118b has a first end connected to negative block 128 and a second end that is aligned with contact pad 22b. Ribbons 118a and 118b are also bent for respective welding to the vertical surfaces of positive block 126 and negative block 128.

Another distinction between terminal platforms 16 and 116 is that, for terminal platform 116, wire 24 extends through negative block 128 at a laterally offset location (i.e., at section line 2E-2E) from the connection location of ribbon 118b (i.e., at section line 2F-2F). This illustrates the versatility of the terminal platforms of the present invention, which may be designed to accommodate a variety of bonding locations relative to battery 12 and hybrid 14.

Figure 2D:
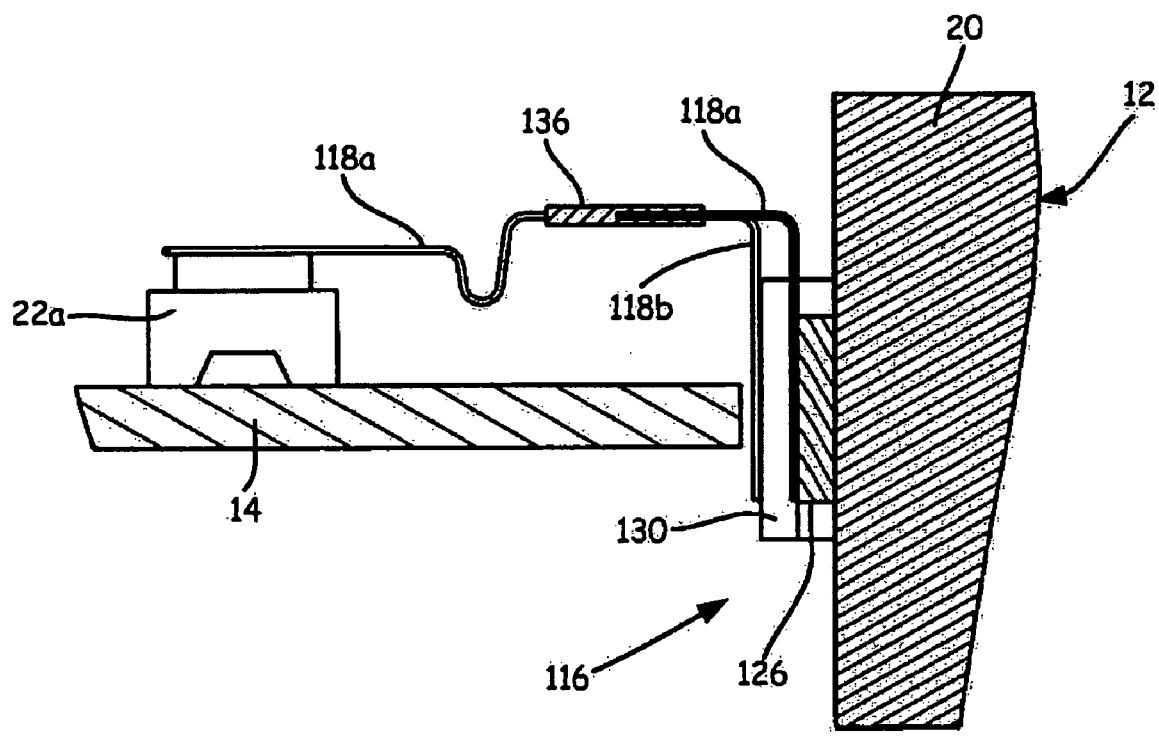
FIG. 2D is a sectional view of section 2D-2D taken in FIG. 2C, showing a positive terminal connection.

FIG. 2D is a sectional view of section 2D-2D taken in FIG. 2C, which focuses on the connections of positive block 126. As shown, positive block 126 is welded to battery housing 20 to provide an electrical connection between positive block 126 and battery housing 20 (i.e., the positive terminal of battery 12). Additionally, ribbon 118a is welded to positive block 126 in a vertical direction that is perpendicular to the welding orientation between contact pad 22a and ribbon 118a. The electrical connection between battery housing 20 and positive block 126 is correspondingly extended to contact pad 22a, which is connected to positive block 126 via ribbon 118a.

Figure 2E:
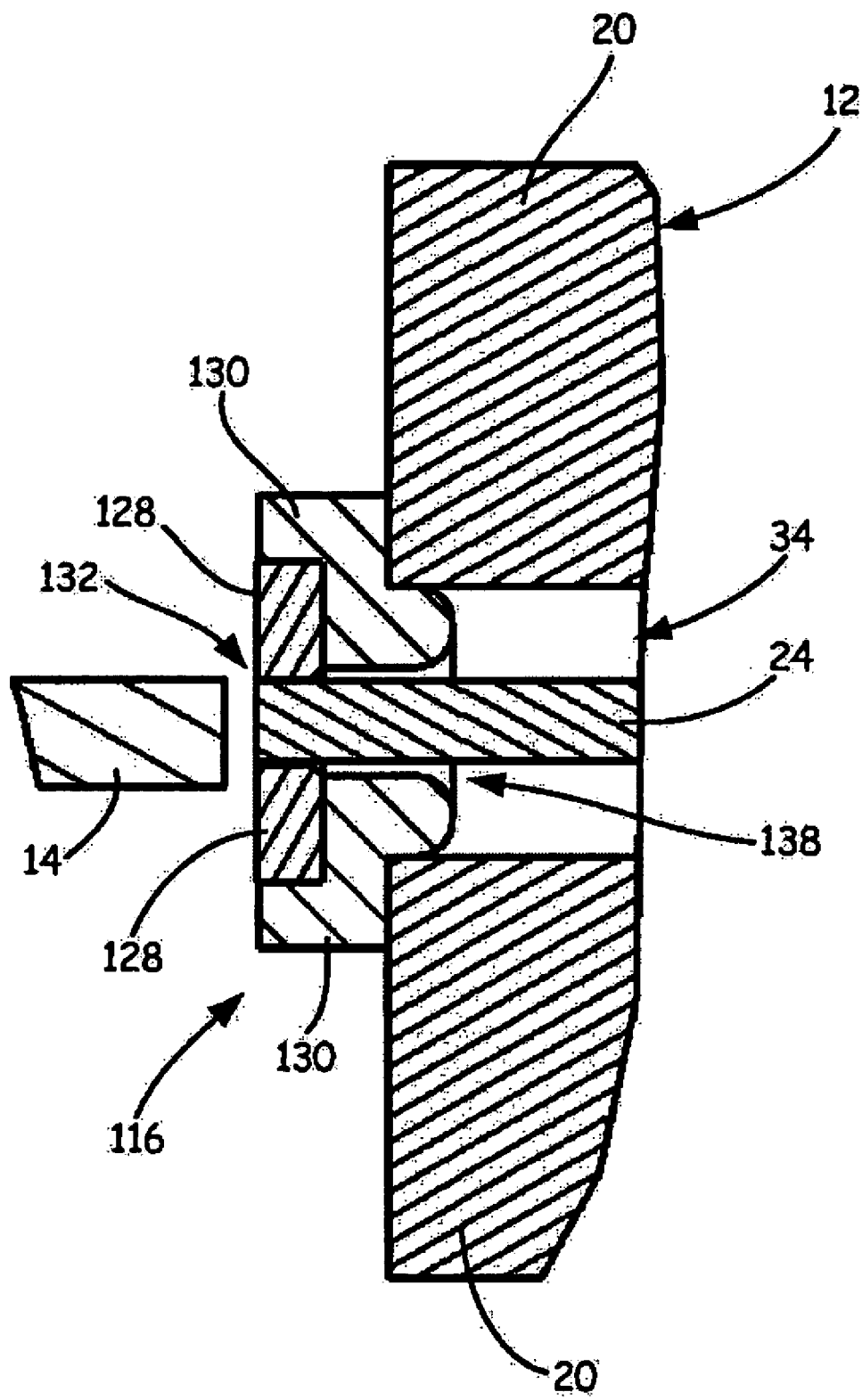
FIG. 2E is a sectional view of section 2E-2E taken in FIG. 2C, showing a negative terminal connection between the battery and the terminal platform.

FIG. 2E is a sectional view of section 2E-2E taken in FIG. 2C, which focuses on the connections of negative block 128 and battery housing 20. As shown, insulating support 130 is molded to extend within opening 34 of battery housing 20. This further increases the support that battery housing 20 provides to terminal platform 116. Insulating support 130 also includes orifice 138, which is an opening that generally aligns with channel 132 of negative block 128. Wire 24 extends through orifice 138 and channel 132 and is welded to negative block 128 within channel 132 to provide an electrical connection.

Figure 2F:
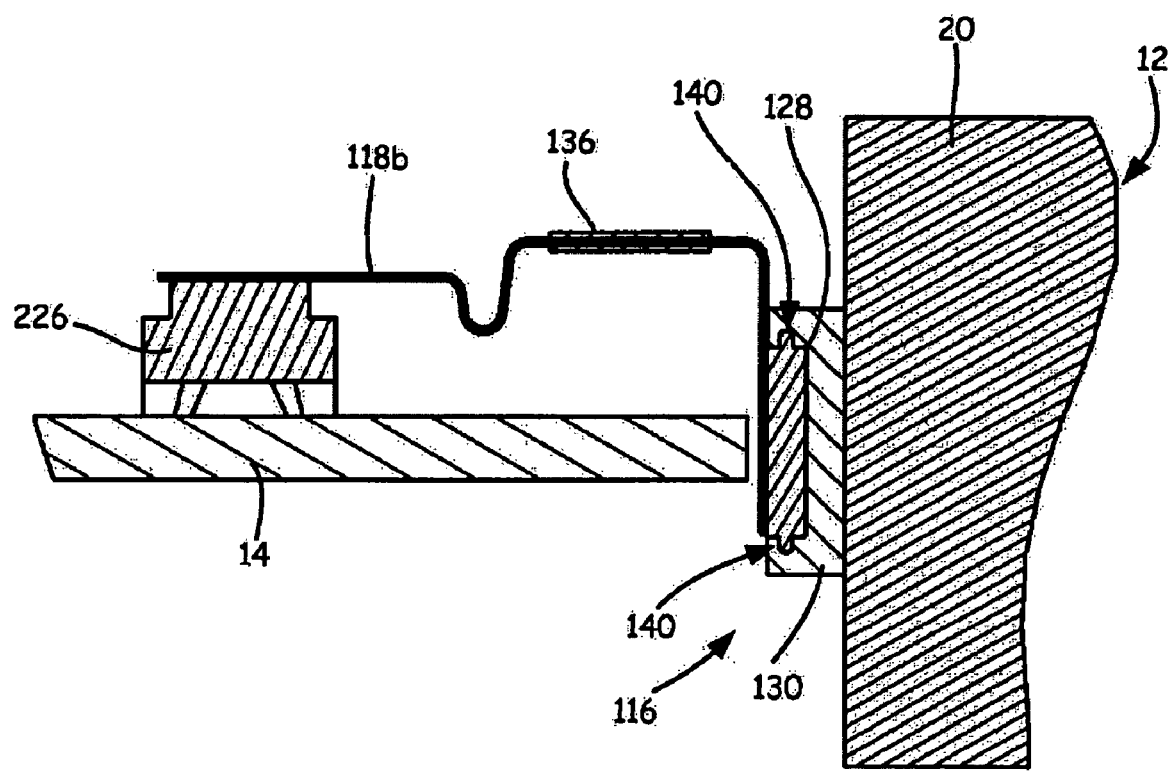
FIG. 2F is a sectional view of section 2F-2F taken in FIG. 2C, showing a negative terminal connection between the hybrid and the terminal platform.

FIG. 2F is a sectional view of section 2F-2F taken in FIG. 2C, which focuses on the connections of negative block 128 and hybrid 14. As shown, negative block 128 includes tabs 140 disposed within insulating support 130 to mechanically lock negative block 128 within insulating support 130. Insulating support 130 mechanically reinforces negative block 128, while also electrically isolating negative block 128 from battery housing 20 and positive block 126.

Ribbon 118b is welded to negative block 128 in a vertical direction that is perpendicular to the welding orientation between contact pad 22b and ribbon 118b. The electrical connection between wire 24 and negative block 128 is correspondingly extended to contact pad 22b, which is connected to negative block 128 via ribbon 118b. Accordingly, the electrical connections between battery 12, hybrid 14, and terminal platform 116 allow battery 12 to relay electrical power to the electronic components of the IMD.

Figure 3:
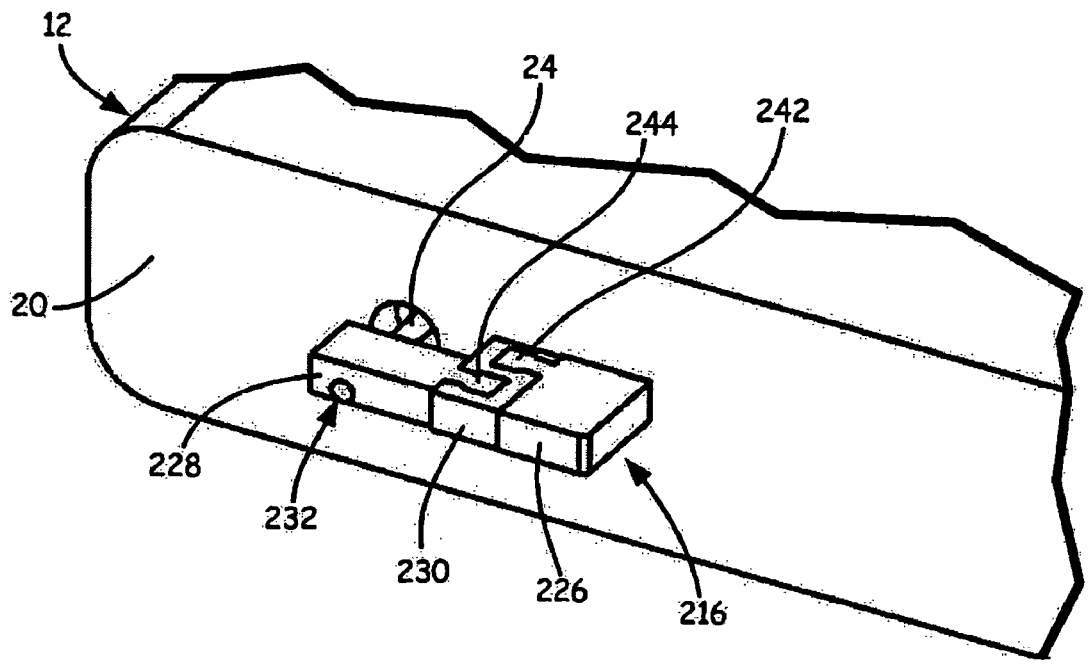
FIG. 3 is a perspective view of a terminal platform secured to a battery of a second alternative electronic assembly.

FIG. 3 is a perspective view of terminal platform 216 secured to battery housing 20, where terminal platform 216 illustrates another alternative design to terminal platform 16. Terminal platform 216 includes positive block 226, negative block 228, and insulating support 230, which function in a similar manner to the corresponding components of terminal platform 16. In this embodiment, positive block 226 and negative block 228 respectively include tabs 242 and 244 that mechanically interlock with insulating support 230. As a result, positive block 226 also functions as a cantilevered anchor that secures negative block 228 and insulating support 230 to battery housing 20.

Terminal platform 216 may be formed and secured to battery housing 20 in the same manner as discussed above for terminal platform 16. As such, once secured to battery housing 20, terminal platform 216 protects wire 24 during subsequent manufacturing processes (e.g., laser ribbon bonding) and use.

Figure 4:
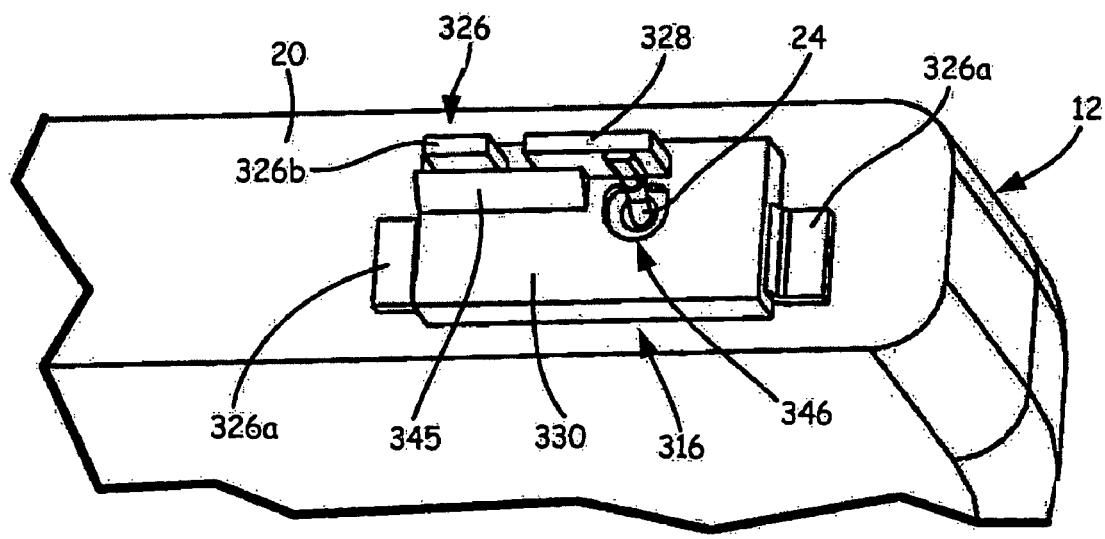
FIG. 4 is a perspective view of a terminal platform secured to a battery of a third alternative electronic assembly.

FIG. 4 is a bottom perspective view of terminal platform 316 secured to battery housing 20, where terminal platform 316 illustrates another alternative design to terminal platform 16. Terminal platform 316 includes positive block 326, negative block 328, insulating support 330, which function in a similar manner to the corresponding components of terminal platform 16. Positive block 326 includes base portion 326a and contact portion 326b. Base portion 326a extends between battery housing 20 and insulating support 330 to provide welding sites at each lateral side of terminal platform 316. As such, base portion 326a functions as a two-point anchor for negative block 328 and insulating portion 330.

Insulating support 330 includes shelf 345, which mechanically supports contact portion 326b of positive block 326 and negative block 328 during manufacturing and use. This further assists positive block 326 and negative block 328 against the compressive forces that occur during laser ribbon bonding processes, and reduces the risk of bending or breaking wire 24.

In this embodiment, wire 24 extends through orifice 346 of base portion 326a and insulating housing 330, and is welded to the bottom surface of negative block 328. This provides an electrical connection between negative block 328 and wire 24. Terminal platform 316 may be formed and secured to battery housing 20 in the same manners as discussed above for terminal platform 16. Once secured to battery housing 20, terminal platform 316 protects wire 24 during subsequent manufacturing and use.

Figure 5:
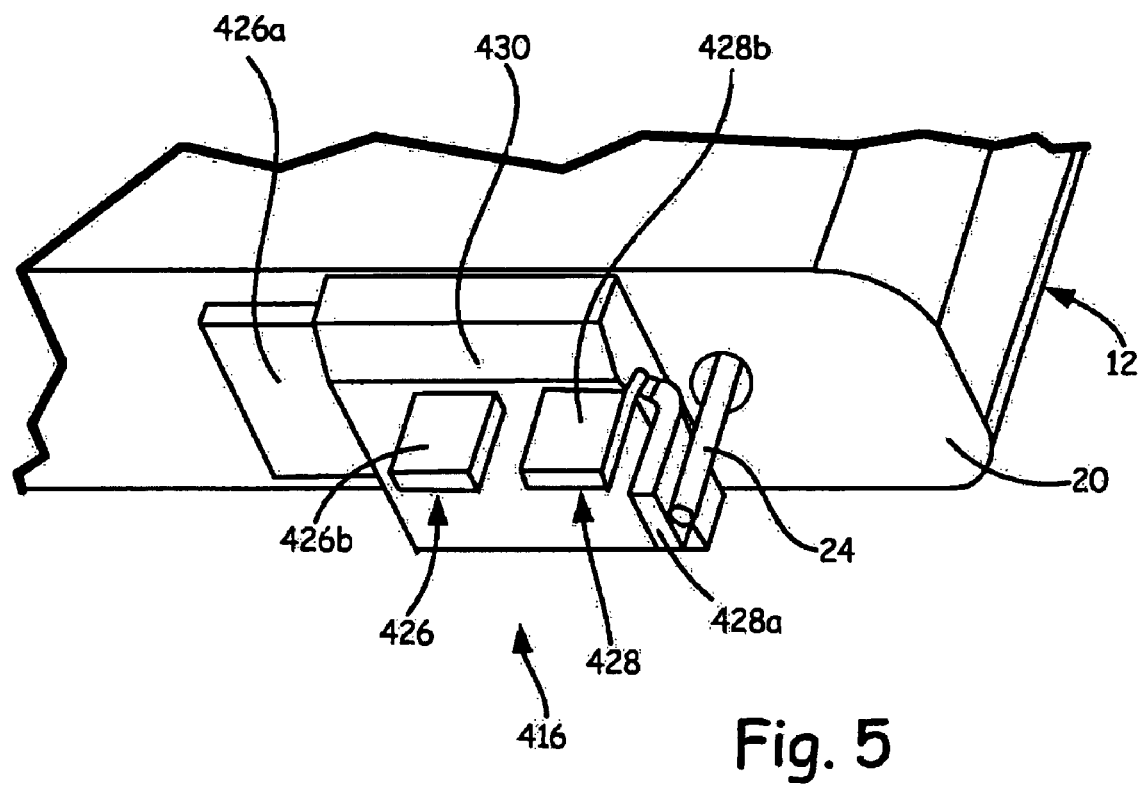
FIG. 5 is a perspective view of a terminal platform secured to a battery of a fourth alternative electronic assembly.

FIG. 5 is a top perspective view of terminal platform 416 secured to battery housing 20, where terminal platform 416 illustrates another alternative design to terminal platform 16. Terminal platform 416 includes positive block 426, negative block 428, and insulating support 430, which also function in a similar manner to the corresponding components of terminal platform 16. In this embodiment, positive block 426 includes base portion 426a and contact portion 426b, which function in the same manner as base portion 26a and contact portion 26b of positive block 26, shown in FIG. 1B.

Negative block 428 includes base portion 428a and contact portion 428b. As shown in FIG. 5, wire 24 extends parallel to base portion 428a, and is welded to base portion 428a to electrically connect negative block 428 to wire 24. Contact portion 428b extends at an offset location from base portion 428a. Thus, compressive forces applied to contact portion 428 are not applied directly to base portion 428b or wire 24. This also reduces the risk of bending or breaking wire 24 during manufacturing and use.

Figure 6A:
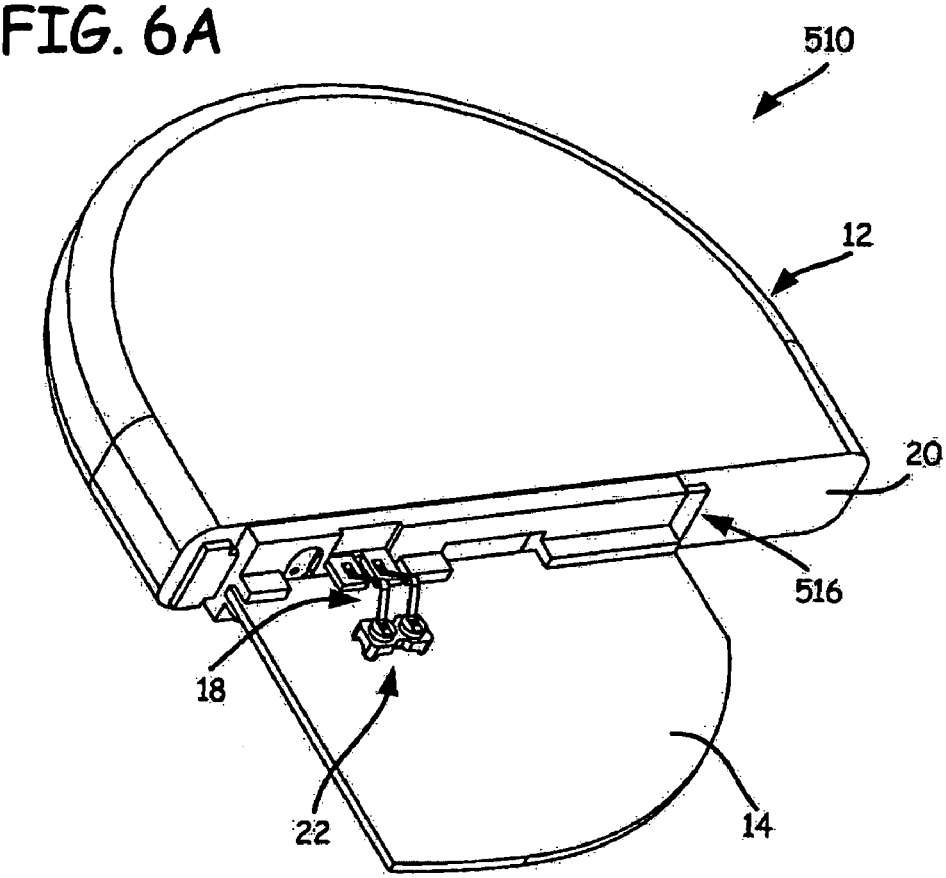
FIG. 6A is a top perspective view of a fifth alternative electronic assembly of an IMD.

FIG. 6A is a top perspective view of electronic assembly 510, which is another alternative to electronic assembly 10 shown in FIGS. 1A-1E. Electronic assembly 510 includes battery 12, hybrid 14, ribbons 18, and terminal platform 516, where battery 12, hybrid 14, and ribbons 18 are the same as shown in FIGS. 1A-1E. Terminal platform 516 is a battery terminal-connecting component secured to battery 12 adjacent hybrid 14, and functions in a similar manner to terminal platform 16 of electronic assembly 10. However, in this embodiment, terminal platform 516 extends across a larger surface of battery housing 12, and physically retains hybrid 14. This provides a rigid connection between battery 12 and hybrid 14, which reduces flexing of electronic assembly 510 during use.

Figure 6B:
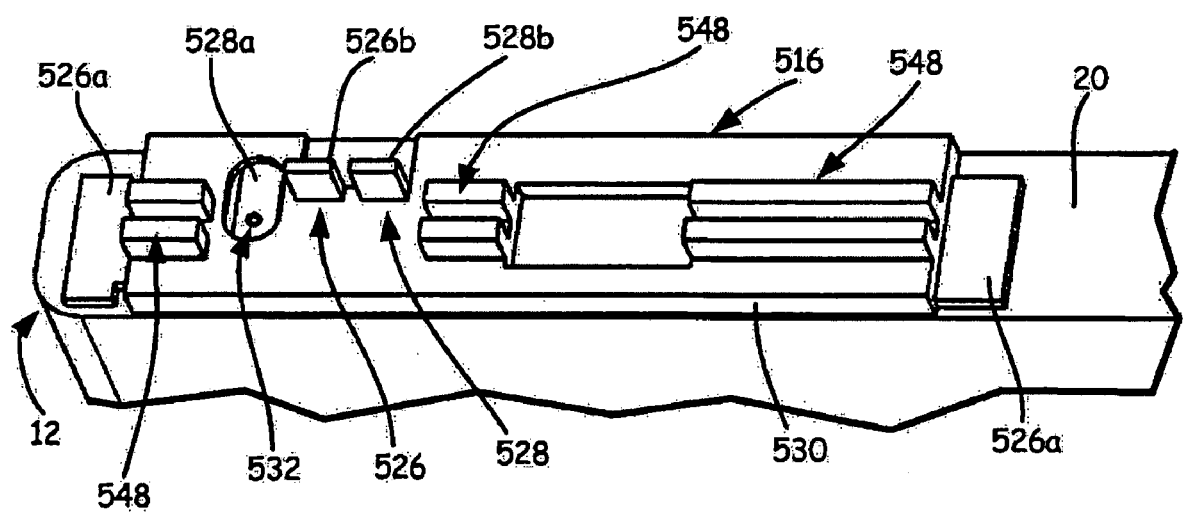
FIG. 6B is an expanded bottom perspective view of a terminal platform secured to a battery of the fifth alternative electronic assembly.

FIG. 6B is an expanded bottom perspective view of terminal platform 516 secured to battery housing 20, where terminal platform 516 includes positive block 526, negative block 528, and insulating support 530, which function in a similar manner to the corresponding components of terminal platform 16. In this embodiment, positive block 526 includes base portion 526a and contact portion 526b, in which base portion 526a extends between insulating support 530 and battery housing 20 to provide welding sites at each lateral side of terminal platform 516. As such, base portion 526a functions as a two-point anchor for negative block 528 and insulating portion 530.

Negative block 528 includes base portion 528a and contact portion 528b, where base portion 528a is laterally offset from contact portion 528b and includes channel 532. While not shown in FIG. 6B, insulating support 530 extends between base portion 528a/contact portion 528b of negative block 528 and battery housing 20/positive block 526 to electrically isolate negative block 528.

Insulating support 530 also includes slots 548, which extend intermittently along insulating support 530, and provide locations to receive and retain hybrid 14. Terminal platform 516 may be formed and secured to battery housing 20 in the same manner as discussed above for terminal platform 16. However, prior to positioning the combined battery 12/terminal platform 516 and hybrid terminal 14 within the IMD casing, hybrid 14 is inserted into slots 548. Hybrid 14 may be secured to slots 548 in a variety of manners, such as mechanical retention, adhesion, and combinations thereof. This prevents hybrid 14 from moving relative to battery 12, thereby reducing flexing of electronic assembly 510.

Figure 7:
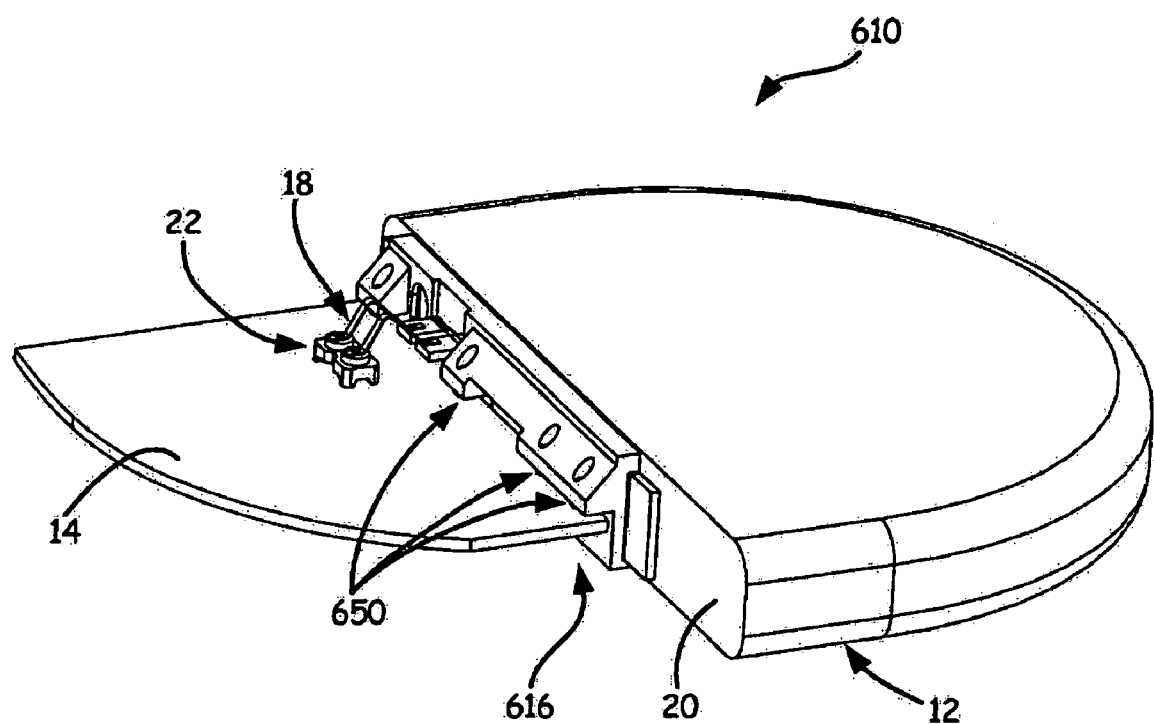
FIG. 7 is a top perspective view of a sixth alternative electronic assembly of an IMD.

FIG. 7 is a top perspective view of electronic assembly 610, which is an alternative internal electronic assembly to electronic assembly 510 shown in FIGS. 6A and 6B. Electronic assembly 610 includes battery 12, hybrid 14, ribbons 18, and terminal platform 616, where battery 12, hybrid 14, and ribbons 18 are the same as shown in FIGS. 1A-1E. Terminal platform 616 is a battery terminal-connecting component secured to battery 12 adjacent hybrid 14, and functions in a similar manner to terminal platform 516 of electronic assembly 510. However, in this embodiment, terminal platform 616 includes compression pads 650 in place of slots 548. When electronic assembly is manufactured, compression pads 650 contact hybrid 14 to increase the stability of hybrid 14 and to reduce relative movement between battery 12 and hybrid 14. This reduces flexing of electronic assembly 610 during use.

Figure 8:
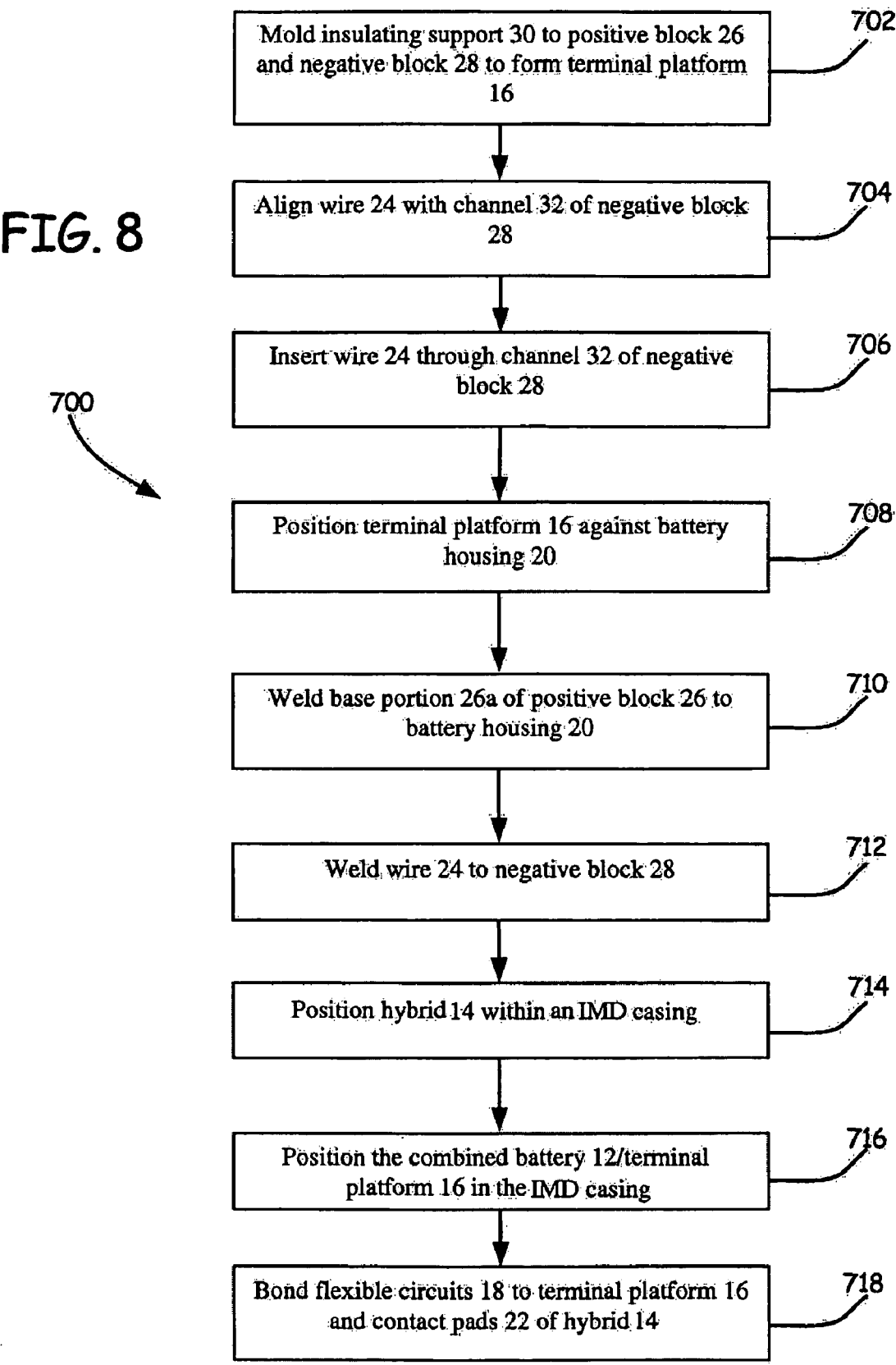
FIG. 8 is a flow diagram of a method of manufacturing the electronic assembly shown in FIG. 1A.

FIG. 8 is a flow diagram of a method of manufacturing electronic assembly 10 (referred to herein as method 700), which is applicable to any of the above-discussed electronic assemblies of the present invention. Method 700, which includes steps 702-716, initially involves molding insulating support 30 to positive block 26 and negative block 28 to form terminal platform 16 (step 702). Terminal platform 16 is then connected to battery 12 by aligning wire 24 of battery 12 with channel 32 of negative block 28 (step 704). Proper alignment is desirable to reduce the risk of bending or breaking wire 24 during the manufacturing process. Wire 24 is then inserted through channel 32 of negative block 28 (step 706), and terminal platform 16 is positioned against battery housing 20 for the welding operations (step 708).

Base portion 26a of positive block 26 is then welded to battery housing 20 (step 710). This secures terminal platform 16 to battery housing 20 and electrically connects positive block 26 to battery housing 20 (i.e., the positive terminal of battery 12). Wire 24 is then welded to negative block 28 to electrically connect wire 24 (i.e., the negative terminal of battery 12) to negative block 28 (step 712).

After terminal platform 16 is secured to battery housing 20, hybrid 14 and the combined battery 12/terminal platform 16 are then positioned and secured in an IMD casing (steps 714 and 716). As discussed above, because wire 24 is protected by terminal platform 16, step 716 may be performed in an automated manner independently of the positioning of hybrid 14. In the embodiment shown in FIGS. 6A and 6B, hybrid 14 may be secured to terminal platform 516 before steps 714 and 716 are performed. Ribbons 18 are then bonded to terminal platform 16 and contact pads 22 of hybrid 14 (step 718) to electrically connect battery 12 and hybrid platform 16. The bonding may be performed with a variety of bonding techniques, such as laser ribbon bonding, resistance spot welding, and parallel gap welding, and may be automated or manual. During the bonding process, terminal platform 16 protects wire 24 from the compressive forces applied to negative block 28. Additional electronic components of the IMD are then connected to the resulting electronic assembly 10. Method 700 is an efficient method for manufacturing electronic assemblies with the use of terminal platforms of the present invention.

Although the present invention has been described with reference to preferred embodiments, workers skilled in the art will recognize that changes may be made in form and detail without departing from the spirit and scope of the invention.

The invention claimed is:

1. A terminal platform for use with a battery and a hybrid of an implantable medical device, the terminal platform comprising:
   a first terminal block securable to a housing of the battery;
   a second terminal block configured to electrically connect to a terminal wire of the battery; and
   an insulating support electrically isolating the second terminal block from the first terminal block,
   wherein the insulating support comprises at least one slot for receiving and physically retaining the hybrid, the hybrid extending from a minor side of the battery in a plane of the battery when the hybrid is inserted into the slot.

2. The terminal platform of claim 1, wherein the insulating support is configured to electrically isolate the second terminal block from the housing of the battery.

3. The terminal platform of claim 1, wherein the second terminal block comprises a channel configured to receive the terminal wire.

4. The terminal platform of claim 1, wherein the insulating support mechanically reinforces the second terminal block.

5. The terminal platform of claim 1, wherein each of the first terminal block and the second terminal block comprises a tab that mechanically interlocks with the insulating support.

6. The terminal platform of claim 1, wherein the first terminal block comprises a base portion and a contact portion disposed perpendicular to each other.

7. The terminal platform of claim 1, wherein the insulating support comprises at least one compression pad.

8. An electronic assembly of an implantable medical device, the electronic assembly comprising:
   a battery comprising:
      a battery housing functioning as a first battery terminal; and
      a second battery terminal;
   a hybrid disposed adjacent a minor side of the battery and extending from the minor side of the battery in a plane of the battery;
   a terminal platform comprising:
   a first terminal block secured to the battery housing such that the first terminal block is electrically connected to the battery housing;
   a second terminal block electrically connected to the second battery terminal, the second terminal block being electrically isolated from the battery housing; and
   an insulating support electrically isolating the second terminal block from the first terminal block;
   a first ribbon electrically connecting the hybrid and the first terminal block; and
   a second ribbon electrically connecting the hybrid and the second terminal block,
   wherein the terminal platform overlaps the hybrid.

9. The electronic assembly of claim 8, wherein the second terminal block comprises a channel configured to receive the second battery terminal.

10. The electronic assembly of claim 8, wherein the insulating support mechanically reinforces the second terminal block.

11. The electronic assembly of claim 8, wherein the first battery terminal is a positive battery terminal and the second battery terminal is a negative battery terminal.

12. The electronic assembly of claim 8, wherein the first terminal block comprises a base portion and a contact portion disposed perpendicular to each other, wherein the base portion is secured to the battery housing and the contact portion is electrically connected to the first ribbon.

13. The electronic assembly of claim 8, wherein the insulating support comprises at least one slot for receiving and physically retaining the hybrid, the hybrid inserted into the slot.

14. The terminal platform of claim 1 wherein the insulating support is secured to the minor side of the battery, the slot configured to physically retain the hybrid extending from the minor side of the battery.

* * * * *